(12) United States Patent
Park et al.

(10) Patent No.: US 8,520,325 B2
(45) Date of Patent: Aug. 27, 2013

(54) PHOTOGRAPHIC LENS OPTICAL SYSTEM

(75) Inventors: Hyong Bae Park, Seoul (KR); Chi Ho An, Gyeonggi-do (KR); Jae Hoon Cho, Gyeonggi-do (KR)

(73) Assignee: Kolen Co., Ltd. (KR)

( * ) Notice: Subject to any disclaimer, the term of this patent is extended or adjusted under 35 U.S.C. 154(b) by 57 days.

(21) Appl. No.: 13/162,231

(22) Filed: Jun. 16, 2011

(65) Prior Publication Data
US 2011/0310493 A1    Dec. 22, 2011

(30) Foreign Application Priority Data
Jun. 16, 2010 (KR) .................. 10-2010-0057118

(51) Int. Cl.
*G02B 9/12*    (2006.01)
*G02B 13/18*    (2006.01)
*G02B 3/02*    (2006.01)

(52) U.S. Cl.
USPC ........................... 359/784; 359/716

(58) Field of Classification Search
USPC ................................. 359/716, 784
See application file for complete search history.

(56) References Cited

U.S. PATENT DOCUMENTS

| | | | |
|---|---|---|---|
| 7,460,315 B1 * | 12/2008 | Cheng et al. | 359/784 |
| 2008/0151394 A1 * | 6/2008 | Nakamura | 359/784 |
| 2008/0170302 A1 * | 7/2008 | Jeong | 359/716 |
| 2008/0266679 A1 * | 10/2008 | Nio | 359/784 |

FOREIGN PATENT DOCUMENTS

| | | |
|---|---|---|
| JP | 2008129349 A | 6/2008 |
| JP | 2009031697 A | 2/2009 |
| KR | 100862392 B1 | 10/2008 |
| KR | 100865338 B1 | 10/2008 |

OTHER PUBLICATIONS

Translation of the Korean Notice of Allowance Application No. KR 10-2010-0057118 Date: Sep. 24, 2012 1 page.

* cited by examiner

*Primary Examiner* — Alicia M Harrington
(74) *Attorney, Agent, or Firm* — St. Onge Steward Johnston & Reens LLC

(57) ABSTRACT

A photographic lens optical system including: a first lens, a second lens, and a third lens sequentially arranged from a side of an object toward an image sensor, wherein the first lens has a positive (+) refractive power and an incident surface that is convex toward the object, the second lens has a negative (−) refractive power and is convex toward the image sensor, the third lens has a negative (−) refractive power, and at least one of an incident surface and an exit surface thereof is aspherical, and wherein an angle of view ($\theta$) of the lens optical system, and a focal length (f) of the lens optical system satisfy the following inequality:

$1.0 < |\tan \theta|/f < 2.0$.

20 Claims, 6 Drawing Sheets

PHOTOGRAPHIC LENS OPTICAL SYSTEM

CROSS-REFERENCE TO RELATED APPLICATIONS

This application claims the benefit of Korean Patent Application No. 10-2010-0057118, filed on Jun. 16, 2010, in the Korean Intellectual Property Office, the disclosure of which is incorporated herein in its entirety by reference.

FIELD OF THE INVENTION

The present invention relates to an optical device, and more particularly, to a lens optical system adopted in a camera.

BACKGROUND OF THE INVENTION

Cameras using solid state image devices, such as charge-coupled devices (CCDs) and complimentary metal oxide semiconductor (CMOS) image sensors, have been rapidly distributed.

Pixel integration degree of the solid state image devices has increased so as to increase the resolution of the cameras. Also, the cameras have been rapidly made compact and light due to the improvement in performance of lens optical systems built in the cameras.

In a general lens optical system of a small camera, a large number of lenses as many as at least four are used to ensure improved performance of the lens optical system, for example, in terms of a large angle of view and aberration correction. Nevertheless, when the lens optical system includes many lenses, this may help widen an angle of view and correct abbreviation, but may hinder making the camera compact and light, leading to increased manufacture and product costs. Accordingly, using a large number of lenses only for improved performance is not practical.

A lens optical system used in an existing camera phone normally has an angle of view of from about 60° to about 63°.

SUMMARY OF THE INVENTION

The present invention provides a lens optical system that is compact and light, has a wide angle of view, and exhibits improved performance.

According to an aspect of the present invention, there is provided a lens optical system including: a first lens, a second lens, and a third lens sequentially arranged from a side of an object toward an image sensor on which an image of the object is formed, wherein the first lens has a positive (+) refractive power and an incident surface that is convex toward the object, the second lens has a negative (−) refractive power and is convex toward the image sensor, the third lens has a negative (−) refractive power and at least one of an incident surface and an exit surface thereof is aspherical.

The lens optical system may satisfy at least one of the following Inequalities 1 to 3 below:

$$1.0 < |\tan \theta|/f < 2.0 \qquad \text{Inequality 1}$$

where θ denotes an angle of view of the lens optical system, and f denotes a focal length of the lens optical system;

$$1.0 < |f/f1| < 1.5 \qquad \text{Inequality 2}$$

where f1 denotes a focal length of the first lens and f denotes a focal length of the lens optical system; and $$-1.0 < (R1-f)/f < 1.0 \qquad \text{Inequality 3}$$

where R1 denotes a curvature radius of an incident surface of the first lens and f denotes a focal length of the lens optical system The first lens may have an exit surface convex toward the image sensor.

The first lens may have an exit surface concave toward the image sensor.

The second lens may be a meniscus lens.

At least one of the first and second lenses may be an aspherical lens.

At least one of an incident surface and an exit surface of at least one of the first and second lenses may be aspherical.

The incident surface and exit surface of the third lens each may have at least one inflection point from a center portion toward an edge portion thereof.

The incident surface of the third lens may have two inflection points from a center portion toward an edge portion thereof.

The exit surface of the third lens may have one inflection point from a center portion toward an edge portion thereof.

With respect to the object, the incident surface of the third lens may be convex in a center portion with changing to concave and then convex toward an edge portion, and with respect to the image sensor, the exit surface of the third lens may be concave in a center portion with changing to convex toward an edge portion.

The second and third lenses may be aberration correction lenses.

The lens optical system may further include an aperture disposed between the first and second lenses.

The lens optical system may further include an infrared ray blocking unit between the object and the image sensor.

The infrared ray blocking unit may be disposed between the third lens and the image sensor.

The lens optical system may have an angle of view (θ) of about 70° or greater.

BRIEF DESCRIPTION OF THE DRAWINGS

The above and other features and advantages of the present invention will become more apparent by describing in detail exemplary embodiments thereof with reference to the attached drawing in which.

DETAILED DESCRIPTION OF THE INVENTION

Figure 1:
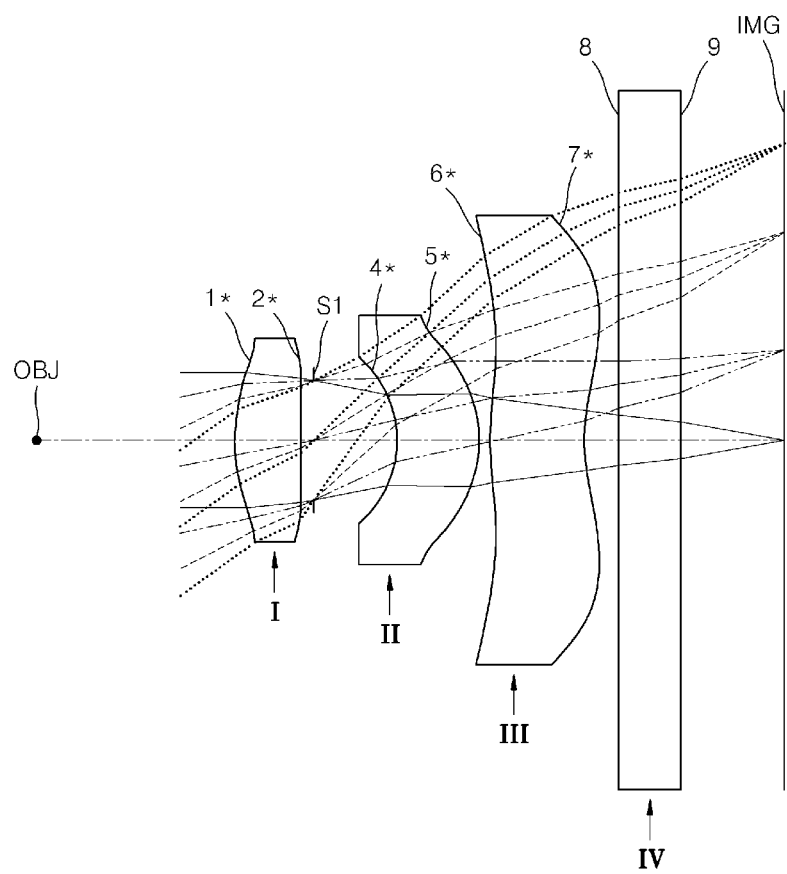
FIGS. 1 to 3 are sectional views illustrating an arrangement of main elements of lens optical systems according to embodiments of the present invention.

Hereinafter, the present invention will be described in detail by explaining exemplary embodiments of the invention with reference to the attached drawings. Like reference numerals in the drawings denote like elements.

Figure 2:
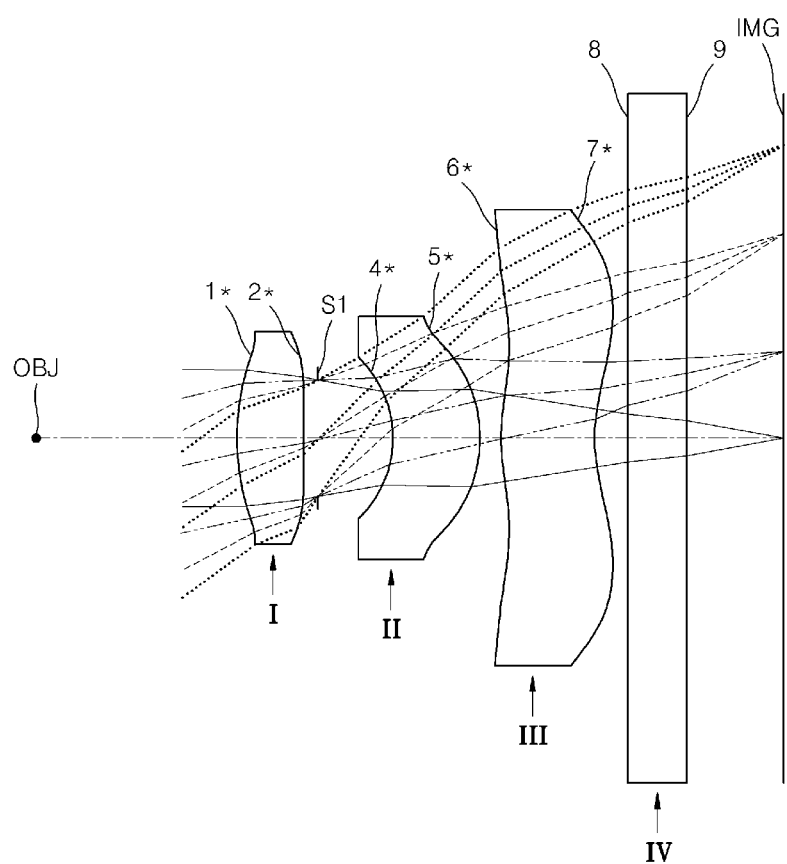
Figure 3:
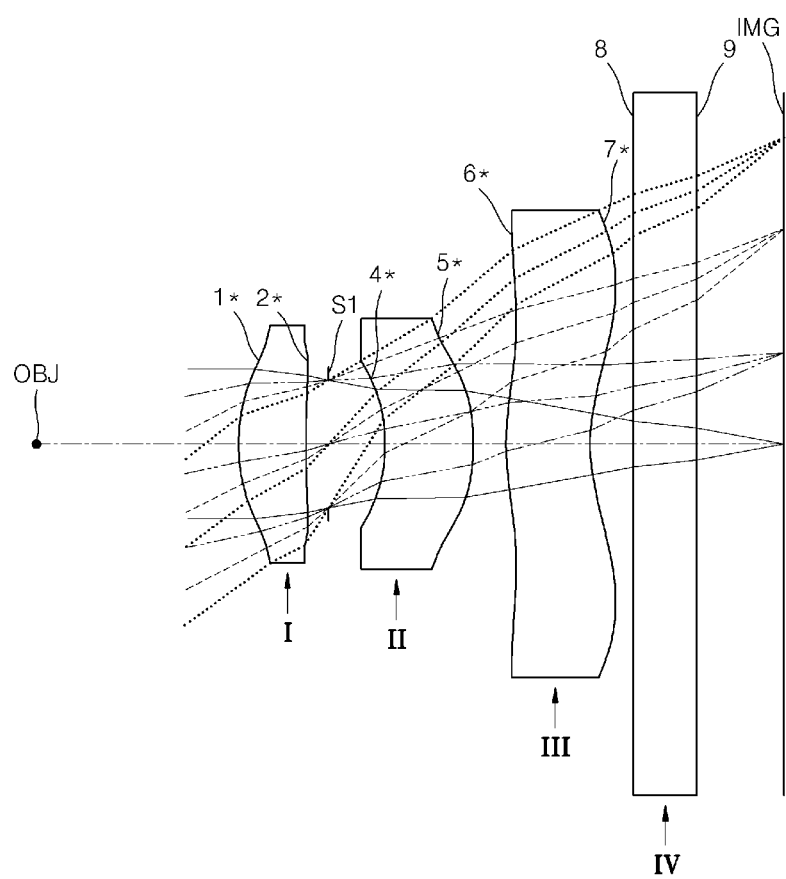

FIGS. 1 to 3 are sectional views illustrating an arrangement of main elements of lens optical systems according to first through third embodiments of the present invention.

Referring to FIGS. 1 to 3, a lens optical system according to each of the embodiments of the present invention includes a first lens I, a second lens II, and a third lens III, which are sequentially arranged from a side of an object OBJ toward an image sensor IMG on which an image of the object OBJ is formed. The first lens I may have a positive (+) refractive power. An incident surface 1* of the first lens I may be convex toward the object OBJ. An exit surface 2* of the first lens I may be convex or concave toward the image sensor IMG. In the embodiments of FIGS. 1 and 2, the exit surface 2* of the first lens I is convex toward the image sensor IMG. In the embodiment of FIG. 3, the exit surface 2* of the first lens I is concave toward the image sensor IMG. Thus, the first lens I may be a biconvex lens (FIGS. 1 and 2) or a meniscus lens that is convex toward the object OBJ (FIG. 3). The second lens II may have a negative (−) refractive power, and may be a menisus lens that is convex toward the image sensor IMG. At least one of the first and second lenses I and II may be an aspherical lens. In other words, at least either the incident surfaces 1* and 4* or the exit surfaces 2* and 5* of at least one of the first and second lenses I and II may be an aspherical surface. For example, all of the incident surfaces 1* and 4* and the exit surfaces 2* and 5* of each of the first and second lenses I and II may be aspherical surfaces. The third lens III may have a negative (−) refractive power. At least one of an incident surface 6* and an exit surface 7* of the third lens III may have at least one inflection point from a center portion toward an edge portion thereof. As illustrated in the embodiments of FIGS. 1 to 3, the incident surface 6* of the third lens III may have two inflection points from a center portion to an edge portion thereof, and the exit surface 7* of the third lens III may have one inflection point from a center portion to an edge portion thereof. In these embodiments, with respect to the object OBJ, the incident surface 6* of the third lens III may be convex in the center region with changing to concave and then convex toward the edge portion thereof. With respect to the image sensor IMG, the exit surface 7* of the third lens III may be concave in the center portion with changing to convex toward the edge portion thereof. The first lens I may have a strong positive (+) refractive power, and the second and third lenses II and III may function as aberration correction lenses.

The lens optical system may further include an aperture S1 and an infrared ray blocking unit IV. The aperture S1 may be disposed between the first lens I and the second lens II. The infrared ray blocking unit IV may be disposed between the third lens III and the image sensor IMG. The infrared ray blocking unit IV may be an infrared ray filter. The positions of the apertures S1 and the infrared ray blocking unit IV may be changed.

The lens optical systems configured as above according to the above-described embodiments may satisfy at least one of the following Inequalities 1 to 3.

$$1.0 < |\tan\theta|/f < 2.0 \qquad \text{Inequality 1}$$

where "θ" denotes an angle of view of the lens optical system, and "f" denotes a focal length of the overall lens optical system.

Inequality 1 defines conditions for determining the angle of view of the lens optical system. If "|tan θ|/f" is equal to or lower than a lower limit of 1.0 in Inequality 1, this may be advantageous to reduce spherical aberration and coma aberration, while the angle of view may be small. On the other hand, if "|tan θ|/f" is equal to or greater than an upper limit of 2.0 in Inequality 1, this may be advantageous to obtain a large angle of view, while spherical aberration and coma aberration may increase.

$$1.0 < |f/f1| < 1.5 \qquad \text{Inequality 2}$$

where "f1" denotes a focal length of the first lens I, and "f" denotes a focal length of the overall lens optical system.

Inequality 2 defines conditions for determining the refractive power of the first lens I, and is associated with spherical aberration correction and the angle of view of the lens optical system. If "|f/f1|" is equal to or lower than a lower limit of 1.0 in Inequality 2, this may advantageous to increase the angle of view of the lens optical system, while correction of spherical aberration may be difficult. On the other hand, if "|f/f1|" is equal to or greater than an upper limit of 1.5 in Inequality 2, this may facilitate correction of spherical aberration, while the angle of view of the lens optical system may be small. If the conditions of Inequality 2 are satisfied, a large angle of view may be ensured with acceptable spherical aberration.

$$-1.0 < (R1-f)/f < 1.0 \qquad \text{Inequality 3}$$

where "R1" denotes a curvature radius of the incident surface 1* of the first lens I, and "f" denotes a focal length of the overall lens optical system.

Inequality 3 defines conditions for determining the shape of the first lens I, and is associated, similar to Inequality 2, with spherical aberration correction and the angle of view of the lens optical system. If "(R1−f)/f" is equal to or less than a lower limit of −1.0 in Inequality 3, correction of spherical aberration may be difficult. On the other hand, if "(R1−f)/f" is equal to or greater than an upper limit of 1.0 in Inequality 3, this may facilitate correction of spherical aberration, while the angle of view may small. If the conditions of Inequality 3 are satisfied, a large angle of view may be ensured with acceptable spherical aberration.

The values of Inequalities 1 to 3 in the above-described first to third embodiments of the present invention are shown in Tables 1-3. In Tables 1-3, the units of f1, f and R1 are in millimeters (mm), and the angle of view (θ) is in angles (°).

TABLE 1

| Classification | θ | f | Inequality 1 (1.0 < \| tanθ \|/f < 2.0) |
|---|---|---|---|
| 1st Embodiment | 72 | 1.963 | 1.568 |
| 2nd Embodiment | 72 | 1.980 | 1.544 |
| 3rd Embodiment | 73 | 1.955 | 1.673 |

TABLE 2

| Classification | f1 | f | Inequality 2 (1.0 < \| f/f1 \| < 1.5) |
|---|---|---|---|
| 1st Embodiment | 1.799 | 1.963 | 1.091 |
| 2nd Embodiment | 1.834 | 1.980 | 1.079 |
| 3rd Embodiment | 1.948 | 1.955 | 1.003 |

TABLE 3

| Classification | R1 | f | Inequality 3 (−1.0 < (R1 − f)/f < 1.0) |
|---|---|---|---|
| 1st Embodiment | 0.9904 | 1.963 | −0.495 |
| 2nd Embodiment | 1.0510 | 1.980 | −0.469 |
| 3rd Embodiment | 0.9249 | 1.955 | −0.526 |

Referring to Tables 1-3, the lens optical systems according to the first to third embodiments of the present invention are found to satisfy Inequalities 1 to 3.

The lens optical systems according to the first to third embodiments of the present invention will be described in detail with reference to lens data and the accompanying drawings.

Tables 4-6 each show curvature radiuses, lens thicknesses or distances between lenses, refractive indexes, and the Abbe numbers of lenses constituting the lens optical system of FIGS. 1-3. In Tables 4-6, "R" denotes a curvature radius, "D" denotes a lens thickness or a distance between lenses or neighboring constituent elements, "$N_d$" denotes a refractive index of a lens measured using a d-line, and "$V_d$" denotes the Abbe number. In numbers of the surfaces of the lenses in Tables 4-6, the mark * denotes that a corresponding lens surface is an aspherical surface. The units of R and D are in millimeters (mm).

TABLE 4

| $1^{st}$ Embodiment | Surface | R | D | $N_d$ | $V_d$ |
|---|---|---|---|---|---|
| I | 1* | 0.9904 | 0.3212 | 1.53 | 55.8 |
|  | 2* | −27.5730 | 0.0580 |  |  |
|  | S1 |  | 0.3988 |  |  |
| II | 4* | −0.5225 | 0.3996 | 1.53 | 55.8 |
|  | 5* | −0.6627 | 0.0483 |  |  |
| III | 6* | 1.1421 | 0.4600 | 1.53 | 55.8 |
|  | 7* | 0.9815 | 0.1611 |  |  |
| IV | 8 |  | 0.3000 | 1.52 | 64.2 |
|  | 9 |  | 0.4028 |  |  |
|  | IMG |  | 0.0539 |  |  |

TABLE 5

| $2^{nd}$ Embodiment | Surface | R | D | $N_d$ | $V_d$ |
|---|---|---|---|---|---|
| I | 1* | 1.0510 | 0.3271 | 1.53 | 55.8 |
|  | 2* | −12.6252 | 0.0700 |  |  |
|  | S1 |  | 0.3639 |  |  |
| II | 4* | −0.5287 | 0.4271 | 1.53 | 55.8 |
|  | 5* | −0.6787 | 0.1000 |  |  |
| III | 6* | 0.9914 | 0.4554 | 1.53 | 55.8 |
|  | 7* | 0.8324 | 0.1611 |  |  |
| IV | 8 |  | 0.3000 | 1.52 | 64.2 |
|  | 9 |  | 0.4028 |  |  |
|  | IMG |  | 0.0616 |  |  |

TABLE 6

| $3^{rd}$ Embodiment | Surface | R | D | $N_d$ | $V_d$ |
|---|---|---|---|---|---|
| I | 1* | 0.9249 | 0.3163 | 1.53 | 55.8 |
|  | 2* | 7.4166 | 0.1000 |  |  |
|  | S1 |  | 0.2637 |  |  |
| II | 4* | −0.8338 | 0.4121 | 1.53 | 55.8 |
|  | 5* | −0.9810 | 0.1535 |  |  |
| III | 6* | 0.9232 | 0.3935 | 1.53 | 55.8 |
|  | 7* | 0.7829 | 0.2000 |  |  |
| IV | 8 |  | 0.3000 | 1.52 | 64.2 |
|  | 9 |  | 0.3970 |  |  |
|  | IMG |  |  |  |  |

The aperture ratio (Fno), focal length (f), and angle of view (θ) of each lens optical system according to the first to third embodiments of the present invention corresponding to FIGS. 1-3 are shown in Table 7.

TABLE 7

| Classification | Aperture ratio (Fno) | Focal length (f) [mm] | Angle of view(θ) [°] |
|---|---|---|---|
| $1^{st}$ Embodiment | 3.0 | 1.963 | 72 |
| $2^{nd}$ Embodiment | 3.0 | 1.980 | 72 |
| $3^{rd}$ Embodiment | 2.8 | 1.955 | 73 |

The aspherical surface of each lens of the lens optical systems according to the first to third embodiments of the present invention satisfy the following aspherical surface equation.

$$x = \frac{c' y^2}{1 + \sqrt{1 - (K+1)c'^2 y^2}} + Ay^4 + By^6 + Cy^8 + Dy^{10} + Ey^{12} \quad \text{[Aspherical surface equation]}$$

In the above aspherical surface equation, "x" denotes a distance from the apex of a lens in a direction along an optical axis, "y" denotes a distance in a direction perpendicular to the optical axis, "c'" denotes a reciprocal number (=1/r) of a curvature radius at the apex of a lens, "K" denotes a conic constant, and "A, B, C, D, and E" denote aspherical surface coefficients.

Tables 8-10 show aspherical surface coefficients of aspherical surfaces of the lens optical systems according to the first to third embodiments corresponding to FIGS. 1-3. Tables 8-10 show aspherical surface coefficients of incident surfaces 1\*, 4\*, and 6\*, and exit surfaces 2\*, 5\*, and 7\* of the respective lenses of Tables 4-6.

TABLE 8

| Surface | K | A | B | C | D | E |
|---|---|---|---|---|---|---|
| 1* | −3.9893 | 0.3142 | −0.9534 | −3.0385 | 4.5540 | −51.6032 |
| 2* | 0.0000 | −0.4078 | −2.8077 | 8.0637 | −46.5446 | 240.0993 |
| 4* | 0.1981 | 1.3126 | −18.5692 | 103.2907 | −33.6767 | 38.6600 |
| 5* | −0.3486 | −1.4367 | 8.4025 | −29.5209 | 40.4334 | 87.6468 |
| 6* | −26.0057 | −0.8745 | 1.2968 | −0.7092 | −0.1222 | 0.2870 |
| 7* | −8.3115 | −0.6083 | 0.6074 | −0.4962 | 0.1371 | 0.0426 |

TABLE 9

| Surface | K | A | B | C | D | E |
|---|---|---|---|---|---|---|
| 1* | −3.2995 | 0.2052 | −1.2875 | −1.8486 | 7.1117 | −52.4823 |
| 2* | −862.5219 | −0.4820 | −2.5112 | 7.8542 | −46.2171 | 235.4459 |

TABLE 9-continued

| Surface | K        | A       | B        | C        | D       | E        |
|---------|----------|---------|----------|----------|---------|----------|
| 4*      | 0.3449   | 1.0543  | −15.1646 | 106.4211 | −4.8172 | 38.6600  |
| 5*      | −0.3112  | −1.5424 | 8.7468   | −28.1532 | 38.3301 | 79.3597  |
| 6*      | −19.2954 | −0.8999 | 1.3437   | −0.6875  | −0.1407 | 0.2572   |
| 7*      | −6.9100  | −0.6129 | 0.6044   | −0.4786  | 0.1602  | 0.0416   |

TABLE 10

| Surface | K        | A       | B       | C        | D        | E        |
|---------|----------|---------|---------|----------|----------|----------|
| 1*      | −1.3104  | 0.0997  | 0.2914  | −4.0918  | 9.8649   | −46.5182 |
| 2*      | −98.9978 | −0.1352 | −2.1160 | 10.8603  | −63.4334 | 163.5550 |
| 4*      | 0.3451   | −0.2163 | −4.6915 | 38.1266  | −11.2299 | −440.0639|
| 5*      | 0.1893   | −1.6732 | 8.9671  | −23.1033 | 30.8267  | 33.8337  |
| 6*      | −13.9597 | −1.0172 | 1.7607  | −1.1025  | −0.1808  | 0.4476   |
| 7*      | −5.8552  | −0.5541 | 0.6816  | −0.6546  | 0.3755   | −0.0586  |

Figure 4:
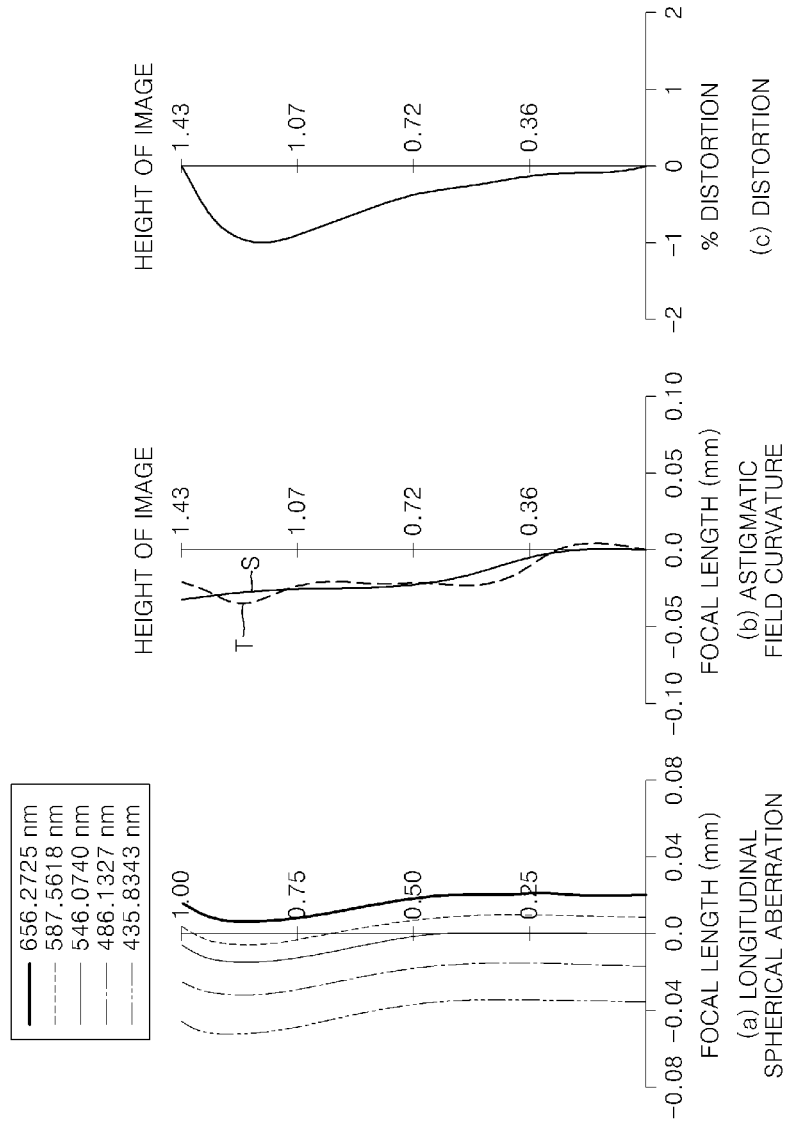
FIG. 4 is an aberration diagram illustrating longitudinal spherical aberration, astigmatic field curvature, and distortion of a lens optical system according to an embodiment of the present invention.

FIG. 4 is an aberration diagram illustrating longitudinal spherical aberration, astigmatic field curvature, and distortion in the lens optical system of FIG. 1 according to the first embodiment of the present invention with data of Table 4.

In FIG. 4, (a) illustrates spherical aberration of the lens optical system with respect to light of various wavelengths, and (b) illustrates astigmatic field curvatures of the lens optical system, including a tangential field curvature T and a sagittal field curvature S. The wavelengths of light used to obtain data of the aberration diagram (a) are 435.8343 nm, 486.1327 nm, 546.0740 nm, 587.5618 nm, and 656.2725 nm. The wavelength of light used to obtain data of the aberration diagrams (b) and (c) is 546.0740 nm. The same wavelengths of light were used to obtain data of FIGS. 5 and 6.

Figure 5:
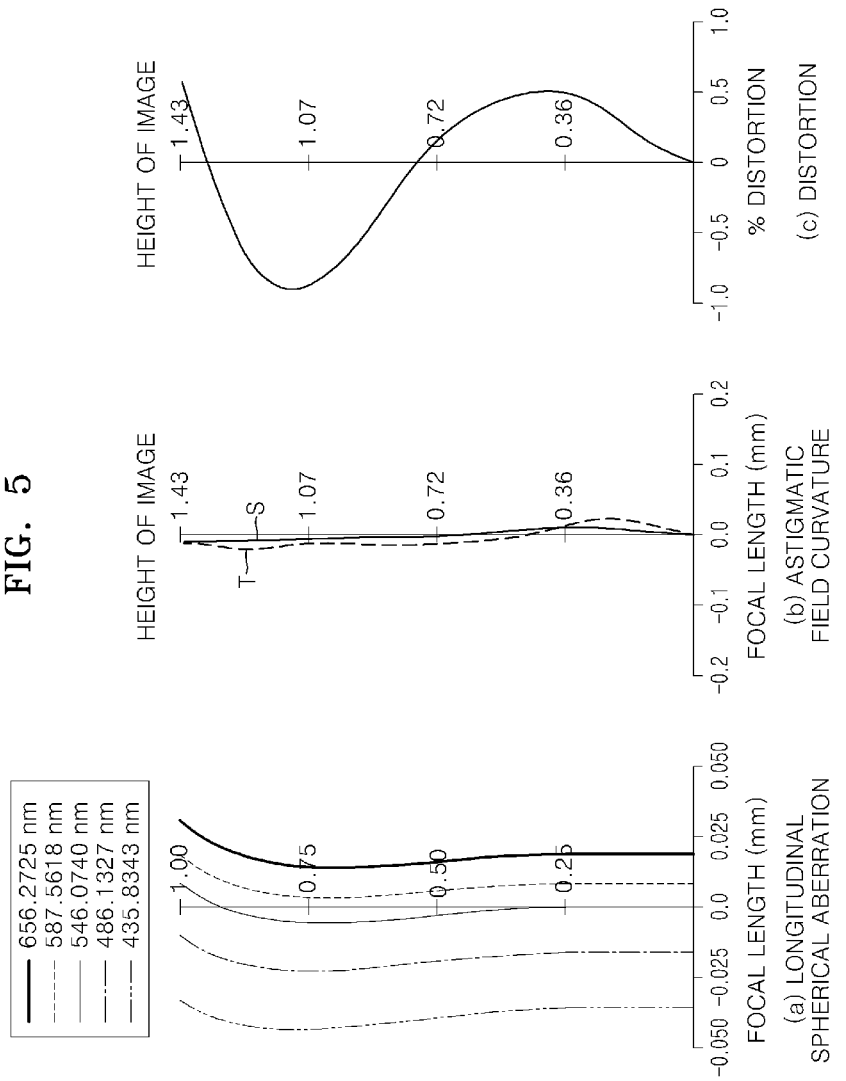
FIG. 5 is an aberration diagram illustrating longitudinal spherical aberration, astigmatic field curvature, and distortion of a lens optical system according to another embodiment of the present invention.

In FIG. 5, (a), (b), and (c) respectively illustrate longitudinal spherical aberration, astigmatic field curvature, and distortion in the lens optical system of FIG. 2 according to the second embodiment of the present invention with data of Table 5.

Figure 6:
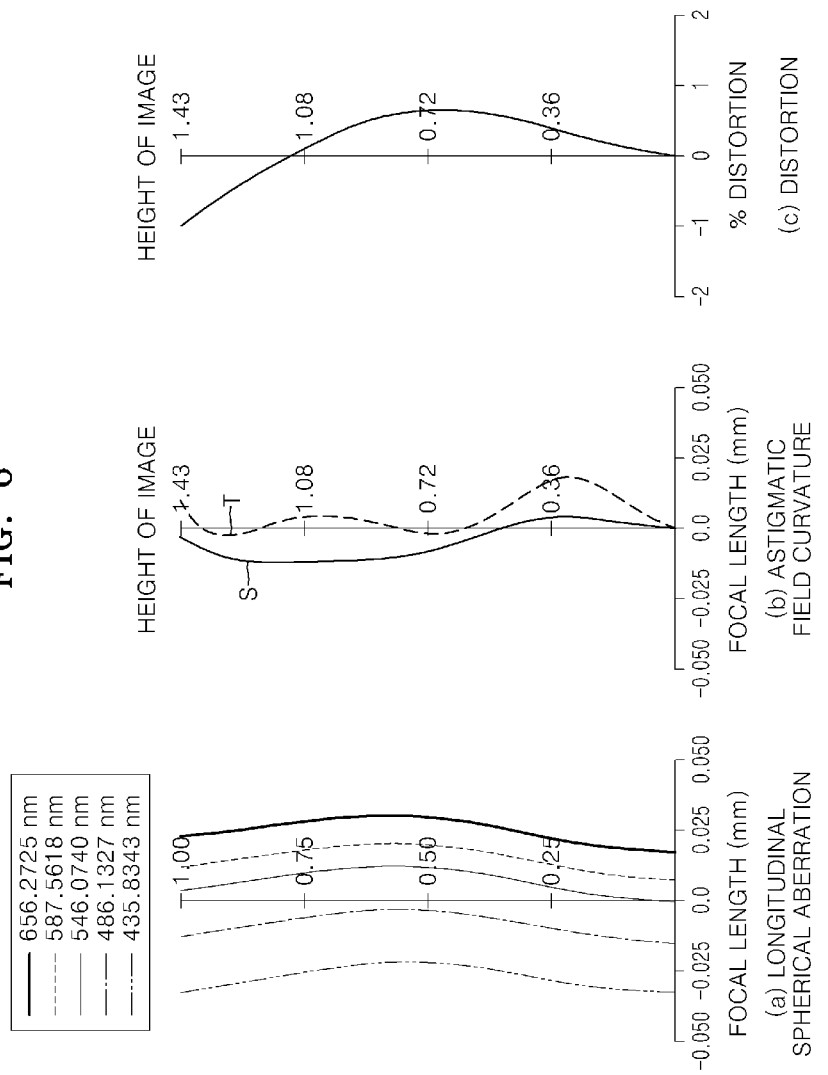
FIG. 6 is an aberration diagram illustrating longitudinal spherical aberration, astigmatic field curvature, and distortion of a lens optical system according to another embodiment of the present invention.

In FIG. 6, (a), (b), and (c) respectively illustrate longitudinal spherical aberration, astigmatic field curvature, and distortion in the lens optical system of FIG. 3 according to the third embodiment of the present invention with data of Table 6.

As described above, according to the above-described embodiments of the present invention, a lens optical system may include the first, second, and third lenses I, II, and III respectively having positive (+), negative (−), and negative (−) refractive powers and sequentially arranged in a direction from the object OBJ to the image sensor IMG, satisfying at least one of Inequalities 1 to 3. Even with the three lenses, the lens optical system may have an angle of view as large as about 70° or greater, and may easily correct various aberrations. According to embodiments of the present invention, a lens optical system that is compact and light with a large angle of view and a high resolution may be manufactured.

While this invention has been particularly shown and described with reference to exemplary embodiments thereof, it will be understood by those of ordinary skill in the art that various changes in form and details may be made therein without departing from the spirit and scope of the invention as defined by the appended claims. For example, a shield film may be used instead of a filter as the infrared ray blocking unit IV. Therefore, the scope of the invention is defined not by the detailed description of the invention but by the appended claims.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A lens optical system comprising:
a first lens, a second lens, and a third lens sequentially arranged from a side of an object toward an image sensor on which an image of the object is formed;
wherein the first lens has a positive (+) refractive power and an incident surface that is convex toward the object, the second lens has a negative (−) refractive power and is convex toward the image sensor, the third lens has a negative (−) refractive power and at least one of an incident surface and an exit surface thereof is aspherical, and wherein the lens optical system satisfies the following inequality:

$1.0 < |\tan \theta|/f < 2.0$, wherein θ denotes an angle of view of the lens optical system, and f denotes a focal length of the lens optical system.

2. The lens optical system of claim 1, wherein a focal length (f1) of the first lens and a focal length (f) of the lens optical system satisfy the following inequality:

$1.0 < |f/f1| < 1.5$.

3. The lens optical system of claim 2, wherein a curvature radius (R1) of an incident surface of the first lens and a focal length (f) of the lens optical system satisfy the following inequality:

$-1.0 < (R1-f)/f < 1.0$.

4. The lens optical system of claim 1, wherein a curvature radius (R1) of an incident surface of the first lens and a focal length (f) of the lens optical system satisfy the following inequality:

$-1.0 < (R1-f)/f < 1.0$.

5. The lens optical system of claim 1, wherein an exit surface of the first lens is convex toward the image sensor.

6. The lens optical system of claim 1, wherein an exit surface of the first lens is concave toward the image sensor.

7. The lens optical system of claim 1, wherein the second lens is a meniscus lens.

8. The lens optical system of claim 1, wherein at least one of the first and second lenses is an aspherical lens.

9. The lens optical system of claim 1, wherein at least one of an incident surface and an exit surface of at least one of the first and second lenses is aspherical.

10. The lens optical system of claim 1, wherein the incident surface and exit surface of the third lens each has at least one inflection point from a center portion toward an edge portion thereof.

11. The lens optical system of claim 10, wherein the incident surface of the third lens has two inflection points from a center portion toward an edge portion thereof.

12. The lens optical system of claim 10, wherein the exit surface of the third lens has one inflection point from a center portion toward an edge portion thereof.

13. The lens optical system of claim 1, wherein with respect to the object, the incident surface of the third lens is convex in a center portion with changing to concave and then convex toward an edge portion, and with respect to the image sensor, the exit surface of the third lens is concave in a center portion with changing to convex toward an edge portion.

14. The lens optical system of claim 1, wherein the second and third lenses are aberration correction lenses.

15. The lens optical system of claim 1, further comprising an aperture disposed between the first and second lenses.

16. The lens optical system of claim 1, further comprising an infrared ray blocking unit between the object and the image sensor.

17. The lens optical system of claim 16, wherein the infrared ray blocking unit is disposed between the third lens and the image sensor.

18. The lens optical system of claim 1, wherein the lens optical system has an angle of view (θ) of about 70° or greater.

19. A lens optical system comprising:
a first lens, a second lens, and a third lens sequentially arranged from a side of an object toward an image sensor on which an image of the object is formed;
wherein the first lens has a positive (+) refractive power and an incident surface that is convex toward the object, the second lens has a negative (−) refractive power and is convex toward the image sensor, the third lens has a negative (−) refractive power and at least one of an incident surface and an exit surface thereof is aspherical, and
wherein the lens optical system satisfies the following inequality:

$1.5 < |\tan \theta|/f < 2.0$, wherein θ denotes an angle of view of the lens optical system, and f denotes a focal length of the lens optical system, and
wherein the lens optical system has an angle of view (θ) of 70° or greater.

20. A lens optical system comprising:
a first lens, a second lens, and a third lens sequentially arranged from a side of an object toward an image sensor on which an image of the object is formed;
wherein the first lens has a positive (+) refractive power and an incident surface that is convex toward the object, the second lens has a negative (−) refractive power and is convex toward the image sensor, the third lens has a negative (−) refractive power and at least one of an incident surface and an exit surface thereof is aspherical, and
wherein the lens optical system satisfies the following inequalities:

$1.5 < |\tan \theta|/f < 2.0$, $1.0 < |f/f1| < 1.5$ wherein θ denotes an angle of view of the lens optical system, f denotes a focal length of the lens optical system, and f1 denotes a focal length of the first lens.

* * * * *